Figure 1:
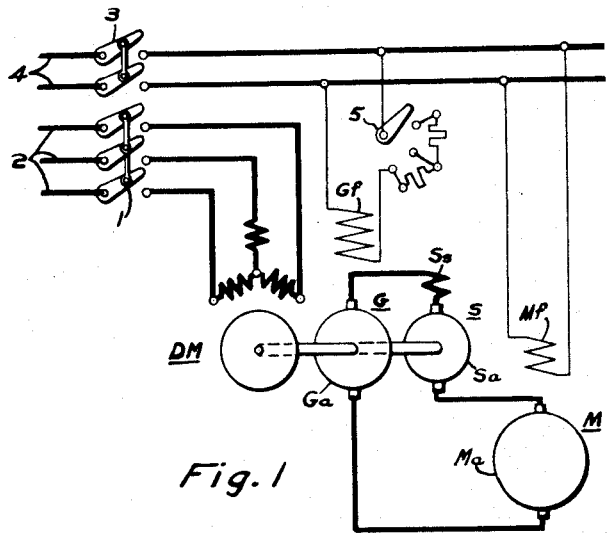

July 10, 1934.     W. F. EAMES     1,966,239
MOTOR CONTROL SYSTEM
Filed April 18, 1930

INVENTOR
William F. Eames.
BY
Wesley G. Carr
ATTORNEY

Patented July 10, 1934

1,966,239

UNITED STATES PATENT OFFICE 1,966,239

MOTOR CONTROL SYSTEM

William F. Eames, Edgewood, Pa., assignor to Westinghouse Electric & Manufacturing Company, a corporation of Pennsylvania Application April 18, 1930, Serial No. 445,305

12 Claims. (Cl. 172—239)

My invention relates to motor-control systems and has particular relation to motor-control systems of the variable-voltage or Ward Leonard type.

In such systems, the armature of a separately excited motor is connected in a loop circuit with the armature of a separately-excited variable-voltage generator; the speed of the motor being determined by the excitation of the generator. Such an arrangement permits operation of the motor at any speed within a wide range, each speed corresponding to a particular value of generator field current; the operating characteristics of the motor at each speed being similar to those of a shunt motor.

The motor-speed regulation in such systems is inherently poor because of the resistance drop in the armatures of the motor and generator and in the conductors connecting them and also because of the speed regulation of the generator-driving means.

Various arrangements have been proposed in the prior art for correcting the motor-speed regulation of such systems, to maintain the motor speed constant, regardless of load. According to one such arrangement, the generator is provided with a cumulative series field winding of sufficient number of turns to cause the generator voltage to rise a sufficient amount, in accordance with the load, to maintain the motor speed constant, regardless of load. In this arrangement, the series field winding and the separately excited field winding of the generator are mounted on the same field poles; the mutual inductance of the windings being, consequently, high.

Upon a sudden change of armature current, therefore, the separately excited field winding acts as a damping winding to temporarily prevent the change of field flux and, consequently, of generator voltage necessary to correct for the change of load. That is to say, upon a sudden change of armature current, a transient current is induced in the separately excited field winding, this transient current being in a directon to oppose the change of field flux which would otherwise be caused by the change of armature current.

Although the generator separately-excited field circuit includes a constant voltage and carries a constant field current, neither of these interferes with the transient otherwise than by adding constant values to it, the latter proceeding as though the field circuit was closed upon itself, as in similar direct-current phenomena.

As the transient current dies out, due to absorption of its energy in the resistance of the separately excited field-winding circuit, the generator field flux and generator voltage gradually assume their corrected value for the change of load. There is, therefore, in the arrangement, a time lag between a change of load and the corresponding change of generator voltage necessary to correct for the change of load.

According to a second arrangement, an auxiliary machine, excited in accordance with the current in the main armature circuit, has its armature connected in series with the main-generator separately-excited field winding and the separate excitation source; thereby introducing the compounding necessary to correct the motor-speed regulation as a voltage impressed on the generator separately-excited field winding. In this arrangement, the change of generator voltage, in response to a change of load, is delayed directly by the time element of the generator-separately-excited field winding; the current in the highly inductive separately-excited field winding changing as an exponential function with respect to time, in a well known manner; the full change of generator field current and generator voltage not appearing until some time after the change of armature current which produced it.

In either of the arrangements noted above, the compounding effect is not as great at high speeds as at low speeds, because of saturation of the generator magnetic circuit. When the motor is operating at high speeds, the generator iron is worked at a higher point on its magnetization curve, thus reducing the change of field flux and generator voltage resulting from a given change of armature current. In order to maintain constant motor speed, regardless of load, at high speeds as well as low speeds, in the above arrangements, therefore, it is necessary to add some means for changing the proportionate effect of the series ampere turns at high and low speeds. When so modified, either arrangement brings about a substantially accurate correction of the motor-speed regulation at all working speeds and loads but requires a considerable time interval for the correction, due to a change of load, to appear as an actual change of generator voltage and motor speed.

While, for some purposes, the time interval just mentioned is not objectionable, it is particularly objectionable where accuracy of motor-speed control is required during acceleration or deceleration. The characteristics of a motor are such that the current drawn during a change of speed differs considerably from that drawn while the motor is driving a load at constant speed, even though the load exerts a constant retarding torque over the range of speed covered during the change. This is due, principally, to the storage of kinetic energy in the motor armature and moving parts during acceleration and the subsequent release of this energy during deceleration.

The inability of the generator voltage, in the arrangements noted above, to follow the rapid changes of current occurring under these conditions causes inaccuracy of the motor-speed control during acceleration or deceleration. This inaccuracy is particularly pronounced and objectionable when the motor must be accelerated or decelerated in a period of time comparable with time required to build up or discharge the generator field. The latter condition obtains in elevator-control systems, the effect of the time interval noted above, in such systems, being to cause the motor-acceleration-and-deceleration curves to vary with the load, so that, if a desirable curve is followed with one elevator load, it will not, in general, be followed with a different load.

It is, accordingly, an object of my invention to provide a variable-voltage motor-control system in which the voltage applied to the motor armature is corrected in accordance with the motor load to maintain the motor speed constant, regardless of load and in which the voltage correction occurs simultaneously with the change of load.

Another object of my invention is to provide a variable-voltage motor-control system in which the voltage applied to the motor armature is corrected in accordance with the motor load to maintain the motor speed constant, regardless of load, and in which the correction for a given change of armature current is substantially the same at high speeds as at low speeds.

According to my invention, I provide separate field pole pieces for the separately-excited field winding and for the winding energized in accordance with the motor current, so that there is substantially no mutual inductance and, consequently, no inductive interference between the windings.

While my invention may be practiced in a number of different ways, I prefer to provide a separate generator for compounding the voltage applied to the motor armature. Accordingly, I provide, in addition to the main separately excited generator, an auxiliary machine having its armature and series field winding connected in series with the armatures of the main generator and the motor.

Other objects of my invention will become evident from the following detailed description, taken in conjunction with the accompanying drawing, in which Fig. 1 is a diagrammatic view of a system of control organized in accordance with the present invention.

Figure 2:
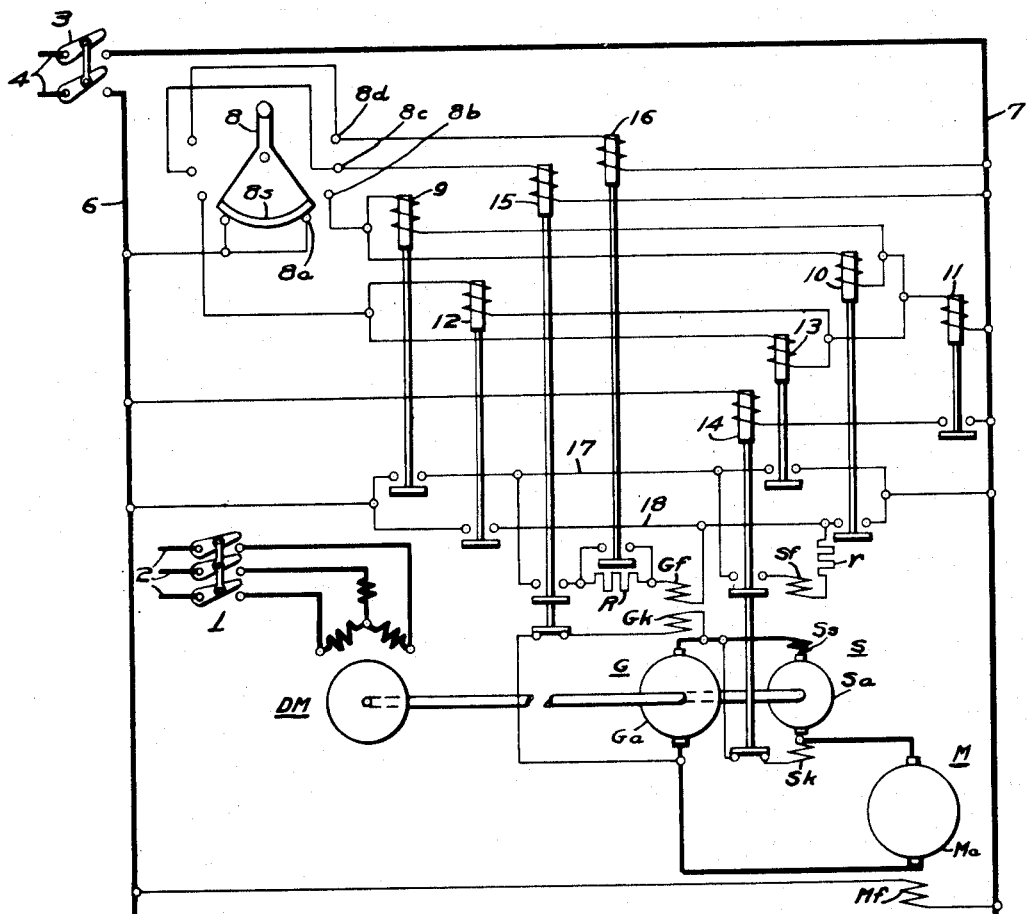

Fig. 2 is a diagrammatic view of a modification of the system shown in Fig. 1.

Referring to the drawing, the apparatus shown in Fig. 1 comprises a motor M having its armature $Ma$ connected in a loop circuit with the armatures $Ga$ and $Sa$ of a main separately-excited generator G and an auxiliary series-excited generator S, respectively. The generators G and S are preferably mounted on the same shaft and are driven by any suitable driving means DM which I have illustrated as an induction motor.

A switch 1 is provided for connecting the induction motor DM to a suitable alternating-current supply 2. A switch 3 is provided for connecting the separately-excited field winding $Mf$ of the motor M to a suitable direct-current supply 4. The separately-excited field winding $Gf$ of the main generator G is arranged to be connected to the direct-current supply 4 through the switch 3 by means of a rheostat 5.

The auxiliary generator S is so connected that it raises the voltage applied to the armature $Ma$ of the motor M when the motor draws power from the generating apparatus and lowers the voltage applied to the motor armature when the motor returns power to the generating apparatus. The auxiliary generator S is so designed and adjusted that its terminal voltage is sufficient to correct for the resistance drops in the armatures of the machines G, S, and M and in the conductors connecting them, and also for the speed regulation of the generator-driving means DM; so that the speed of the motor may be held approximately constant, regardless of the motor load.

The operation of the system shown in Fig. 1 is as follows. Upon closure of switches 1 and 3, the induction motor DM is connected to the alternating-current supply 2, and the field winding $Mf$ of the motor M is connected to the direct-current supply 4. The induction motor DM commences to rotate, driving the generators G and S. The generators G and S generate no voltage at this time, however, as the field winding GF of the former is disconnected and there is no current flowing in the armature circuit to excite the latter. After the induction motor has been brought up to speed, the rheostat 5 may be moved to its first operating position. This completes a circuit for the separately-excited field winding $Gf$ of the main generator through the full resistance of the rheostat.

The voltage of the main generator G now builds up to a low value, and the armature of motor M begins to turn, increasing in speed until it reaches a predetermined low speed. The current drawn by the motor M, flowing through the armatures of machines G, S and M, sets up resistance drops in each of the armatures proportional to the load and also loads the generator G, causing the slip of induction motor DM to increase; all of these effects tending to decrease the speed of motor M. However, the motor current flowing through the series winding $Ss$ of the auxiliary generator S, excites the auxiliary generator, thereby raising the voltage applied to the motor terminals by an amount sufficient to compensate for the effects above mentioned, hence maintaining the speed of motor M, constant at the predetermined value mentioned above.

If the load on the motor changes, the resistance drop around the loop circuit and the slip of induction motor DM change, and the voltage of auxiliary generator S changes a proportionate amount, maintaining the motor speed at the predetermined value.

If the direction of power reverses, that is, if the motor M overhauls; the motor M acts as a generator, returning power to the generator G which, in turn, acts as a motor, driving the induction motor somewhat above synchronous speed. The resistance drop around the loop circuit is now reversed, as is the slip of the induction motor. However, the direction of the voltage generated by the auxiliary generator S is also reversed, and the voltage applied to the armature terminals of generator G is raised a sufficient amount above the terminal voltage of motor M to maintain the speed of the latter at the pre-determined value.

It will be noted that the series field winding Ss, which causes a change of motor terminal voltage in response to a change of load, is not inductively related to the main-generator separately-excited field winding Gf and is, therefore, free to cause a substantially instantaneous change of voltage upon a change of load.

If the rheostat 5 is moved to its next operating position the voltage of generator G builds up to an intermediate value, the speed of motor M increasing, accordingly, to an intermediate value, being maintained constant at the latter value by the action of auxiliary generator S, in the manner previously described.

Similarly, if the rheostat 5 is moved to its last operating position, the voltage of generator G builds up to its maximum value, the speed of motor M increasing, accordingly, to its high-speed value where it is maintained, regardless of load, in the manner previously described. It will be noted that saturation of the magnetic circuit of generator G, in this arrangement, in no way affects the motor-speed regulation, as the regulating voltage is derived entirely from generator S. The speed regulation is thus as good at high speed as at low speed, regardless of the point on its magnetization curve at which the iron of generator G is worked at high speed.

Referring to Fig. 2 of the drawing, the apparatus shown therein comprises a motor M provided with a separately-excited field winding Mf, a main generator G provided with a separately-excited field winding Gf, and auxiliary generator S provided with a series winding Ss and driving means DM, all arranged and connected in substantially the same manner as the corresponding elements in Fig. 1.

In the arrangement shown in Fig. 2, however, the main generator G is provided with a de-magnetizing or suicide field winding Gk, and the auxiliary generator S is provided with a separately-excited field winding Sf and with a suicide field winding Sk. Supply conductors 6 and 7 are arranged to be connected to a direct-current source 4 by means of a switch 3. A switch 1 is provided for connecting the induction motor DM to a direct-current supply 2 as in Fig. 1. A resistor r is provided in series with the separately-excited field winding Sf to decrease the time element of the latter.

A manual controller 8 is arranged to connect the operating coils of a pair of reversing switches 9 and 10 to the supply conductors 6 and 7 in series with the operating coil of a relay 11 in its first operating position for one direction of motor rotation; or to connect the operating coils of a second pair of reversing switches 12 and 13 to the supply conductors 6 and 7 in series with the operating coil of relay 11 in its first operating position for the opposite direction of motor rotation. In its second and third operating position for either direction of travel, the manual controller 8 successively completes circuits for the operating coils of an intermediate-speed switch 15 and a high-speed switch 16, in well known manner.

The pairs of reversing switches 9, 10, and 12, 13 are arranged to partially complete circuits for the separately-excited field windings Gf and Sf of the main and auxiliary generators G and S, respectively. The relay 11 controls the circuit of the operating coil of a low-speed switch 14. The low-speed switch 14 is arranged, upon energization, to disconnect the suicide field winding Sk from the armature terminals of auxiliary generator S and to complete the circuit of the separately-excited field winding Sf.

The intermediate-speed switch 15 is arranged, upon energization, to disconnect the suicide field winding Gk from the armature terminals of the main generator G and to complete the circuit of the separately-excited field winding Gf. The high-speed switch 16 is arranged, when energized, to short circuit a resistor R in series with the separately-excited field winding Gf.

The operation of the system shown in Fig. 2 may be set forth as follows: Upon closure of the switches 1 and 3, the induction motor DM is connected to the alternating-current supply 2, and the field winding Mf of the motor M is connected to the direct-current supply 4. The induction motor DM commences to rotate, driving the generators G and S. The generator G generates no voltage at this time, however, as its separately-excited field winding Gf is disconnected, and its suicide winding Gk is connected to its armature terminals. It will be understood that a suicide winding produces a de-magnetizing flux proportioned to the terminal voltage, so that if, for any reason, a voltage exists across the generator armature, the suicide winding produces a flux in such direction and of such value as to reduce this voltage to zero.

The auxiliary generator S generates no voltage, as no current is flowing in the armature circuit, and the auxiliary generator suicide winding Sk is connected to its armature terminals.

After the induction motor DM has been brought up to speed, the motor M may be put in operation in either direction by the manual controller 8.

If the handle of manual controller is moved to the left to the first operating position, contact segment 8s of the manual controller bridges contact members 8a and 8b, completing a circuit for the operating coils of reversing switches 9 and 10 and relay 11. This circuit may be traced from supply conductor 6, through contact members 8s, 8a and 8b of the manual controller, the operating coils of reversing switches 9 and 10, in parallel, and the operating coil of relay 11, to supply conductor 7. Reversing switches 9 and 10 and relay 11 close.

Reversing switch 9, in closing, connects conductor 17 to supply conductor 6. Reversing switch 10, in closing, connects conductor 18 to supply conductor 7. Relay 11, in closing, completes a circuit for the operating coil of low-speed switch 14. This circuit extends from supply conductor 6, through the operating coil of low-speed switch 14, and contact members of relay 11, to supply conductor 7. Low-speed switch 14 closes, connecting the separately-excited field winding Sf of the auxiliary generator to conductors 17 and 18 in series with resistor r, and disconnecting the suicide winding Sk from the terminals of the auxiliary-generator armature The voltage of auxiliary generator S now builds up to a low value, and the motor M operates at a corresponding low speed. The speed of the motor is held constant, regardless of load, by the action of the series field winding Ss in the manner described in connection with Fig. 1.

The voltage now generated by the auxiliary generator is a small fraction of the total voltage supplied to the motor when the latter operates at full speed (which conditions will be hereinafter more fully described) so that the ratio of inductance to resistance in the circuit of the field winding Sf may be quite small, as compared with the corresponding ratio in the circuit of the field winding Gf. The field winding Sf, therefore, has comparatively little damping effect upon the changes in field flux caused by the series winding Ss, the delay between a change in motor current and the corresponding change of voltage supplied to the motor being negligible.

If the handle of manual controller 8 is moved further to the left, to its intermediate operating position, contact segment 8s bridges contact members 8a and 8c to complete a circuit for the operating coil of intermediate-speed switch 15. This circuit extends from supply conductor 6, through contact members 8a, 8s and 8c, of the manual controller, and the operating coil of intermediate-speed switch 15, to supply conductor 7. Intermediate-speed switch 15 closes to connect the separately-excited winding Gf of generator G to conductors 17 and 18, in series with resistor R, and breaking the circuit of the suicide winding Gk. The voltage of generator G now builds up to a moderate value, and the motor M operates at an intermediate speed corresponding to the sum of the voltages of generator G and S. The series field winding Ss operates to maintain the speed of motor M constant, in the manner previously described. It will be noted that, while the generating apparatus now includes a winding (Gf) of high ratio of inductance to resistance, this winding is not inductively related to the series winding Ss and, therefore, exerts no damping influence on the latter.

If the handle of manual controller 8 is moved farther to the left to its last operating position, contact segment 8s of the controller bridges contact members 8a and 8d to complete a circuit for the operating coil of high-speed switch 16. This circuit extends from supply conductor 6, through contact members 8a, 8s and 8d of the manual controller and the operating coil of high-speed switch 16, to supply conductor 7. High-speed switch 16 closes to short circuit resistor R in series with the field winding Gf. The voltage of generator G now builds up to its maximum value, and the motor M operates at its maximum speed corresponding to the sum of the voltages of generators G and S. The series field winding Ss operates, in the manner previously described, to maintain the speed of motor M constant, regardless of load.

If the handle of manual controller 8 is now returned toward its central position, the operations described above are performed in reverse sequence, the speed of motor being reduced successively to intermediate and low speeds and the motor finally being brought to rest. The successive completion of the suicide-winding circuits of generators G and S as the intermediate-speed switch 15 and low-speed switch 14 drop out, successively reduces the voltages of generators G and S to zero, killing any residual magnetism present in either generator.

While I have described a complete cycle of operation of motor M from rest to high speed and back to rest, it will be understood that the motor may be operated continuously at low or at intermediate speed by arresting the manual controller in the corresponding position.

Operation of the motor in the reverse direction will readily be understood from the above, being identical with the operation described except that the handle of manual controller 8 is moved to the right and that reversing switches 12 and 13 are closed rather than reversing switches 9 and 10.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor-control system, a motor; means for generating a voltage having a fixed component and a variable component, excitation means for said first mentioned means comprising a field winding for furnishing the excitation for said fixed component and a second field winding non-inductively related to said first mentioned field winding for directly furnishing the excitation for said variable component; means operating upon said first mentioned field winding for adjusting said fixed component to thereby control the speed of said motor; and conductors connecting the armature of said motor to said first mentioned means in series with said second field winding; whereby interchange of energy between said field windings by induction is avoided and said variable component varies substantially simultaneously with the current in said second winding.

2. In a motor-control system, a motor; means for generating a voltage having a fixed component and a variable component, excitation means for said first mentioned means comprising a field winding for furnishing the excitation for said fixed component and a second field winding, energized in accordance with the current drawn by said motor and non-inductively related to said first mentioned field winding, for directly furnishing the excitation for said variable component, means operating upon said first mentioned field winding for adjusting said fixed component to thereby vary the speed of said motor, and conductors completing a circuit between the armature of said motor and said first mentioned means, whereby interchange of energy between said field windings by induction is avoided and said variable component varies substantially simultaneously with the current in said second winding.

3. In a motor-control system, a motor, means for generating a voltage having a fixed component and a variable component, excitation means for said first mentioned means comprising a field winding for furnishing the excitation for said fixed component and a second field winding, non-inductively related to said first mentioned field winding, for directly furnishing the excitation for said variable component, means operating upon said first mentioned field winding for adjusting said fixed component to thereby control the speed of said motor, and conductors connecting the armature of said motor, said first mentioned means and said second field winding in a series circuit, in such relative direction that said fixed component and said variable component act in the same direction around said series circuit when said first mentioned means supplies power to said motor and in opposite directions when said motor supplies power to said first mentioned means, whereby the voltage generated by said first mentioned means rises in accordance with the load when said first mentioned means supplies power to said motor, interchange of energy between said field windings by induction is avoided and said variable component varies substantially simultaneously with the current in said second field winding.

4. In a motor-control system, a motor, means for generating a voltage having a fixed component and a variable component, excitation means for said first mentioned means comprising a field winding for furnishing the excitation for said fixed component, and a second field winding, energized in accordance with the current drawn by said motor and non-inductively related to said first mentioned field winding for directly furnishing the excitation for said variable component, said second field winding being energized to such degree as to control said variable component to maintain the speed of said motor constant, regardless of load; means operating upon said first mentioned field winding for adjusting said fixed component to thereby vary the speed of said motor; and conductors completing a circuit between the armature of said motor and said first mentioned means, whereby said motor may be operated at any of a plurality of constant speeds, each independent of load, interchange of energy between said windings by induction is avoided and said variable component varies substantially simultaneously with the current in said second winding.

5. In a motor-control system, a motor, means for generating a voltage having a fixed component and a variable component, excitation means for said first mentioned means comprising a field winding for furnishing the excitation for said fixed component and a second field winding non-inductively related to said first mentioned field winding for directly furnishing the excitation for said variable component, means operating upon said first mentioned field winding for adjusting said fixed component to thereby control the speed of said motor, and a conductor connecting the armature of said motor, said first mentioned means and said second field winding in a series circuit, said second field winding being so designed and so connected in said series circuit as to control said variable component to maintain the speed of said motor constant, regardless of load; whereby said motor may be operated at any of a plurality of constant speeds, each independent of load, interchange of energy between said windings by induction is avoided and said variable component varies substantially simultaneously with the current in said second winding.

6. In a motor-control system, a motor, means for generating a voltage having a fixed component and a variable component, excitation means for said first mentioned means comprising a pair of field windings for furnishing the excitation for said fixed component and a third field winding, non-inductively related to one of said pair of field windings, for directly furnishing the excitation for said variable component, means operating upon said pair of field windings for adjusting said fixed component to thereby vary the speed of said motor; and conductors connecting the armature of said motor to said first mentioned means in series with said third field windings, whereby interchange of energy between said third field winding and said one of said pair of field windings by induction is avoided and said variable component varies rapidly in response to a change of current in said third field windings.

7. In a motor-control system, a motor, means for generating a voltage having a fixed component and a variable component, excitation means for said first mentioned means comprising a first field winding and a second field winding for furnishing the excitation for said fixed component, said second field winding having a smaller ratio of inductance to resistance than said first field winding, and a third field winding non-inductively related to said first field winding for directly furnishing the excitation for said variable component, means operating upon said first and second field windings for adjusting said fixed component to thereby vary the speed of said motor, and conductors connecting the armature of said motor to said first mentioned means in series with said third field winding, whereby interchange of energy between said first and third field windings by induction is avoided and said variable component varies substantially simultaneously with the current in said third field winding.

8. In a motor-control system, a motor, a main generator and auxiliary generator having a field winding energized in accordance with the current drawn by said motor, said field winding being energized to such a degree as to control the voltage of said auxiliary generator to maintain the speed of said motor constant, regardless of load, conductors completing a circuit including the armatures of said main generator, said auxiliary generator and said motor, and a control means for changing the excitation of said main generator to thereby change the speed of said motor.

9. In a motor-control system, a motor, a main generator, an auxiliary generator having a series field winding, conductors connecting said series winding and the armatures of said motor and generators in a series circuit, said series winding being so designed and so connected in said series circuit as to control the voltage of said auxiliary generator to maintain the speed of said motor constant, regardless of load, and a control means for changing the excitation of said main generator to thereby change the constant speed at which said motor operates.

10. In a motor-control system, a motor, a main generator, an auxiliary generator having a series field winding, conductors connecting said series winding and the armatures of said main generator, said auxiliary generator and said motor in a series circuit, means for controlling the excitation of said main generator to thereby control the speed of said motor, and means for stopping said motor, said last mentioned means comprising means for completing a suicide connection for said auxiliary generator.

11. In a motor-control system, a motor, a main generator, an auxiliary generator having a series field winding and a suicide winding, conductors connecting said series winding and the armatures of said main generator, said auxiliary generator and said motor in a series circuit, means for controlling the excitation of said main generator to thereby control the speed of said motor, and means for stopping said motor, said last mentioned means comprising means for connecting said suicide winding in circuit with the armature of said auxiliary generator.

12. In combination, a motor, a main generator, a closed loop including the armatures of said motor and said generator, an auxiliary series excited generator included in said loop and dependent for excitation upon the current traversing said loop, and means affording a separate current supply for the field of said main generator upon which excitation of said main generator is wholly dependent.

WILLIAM F. EAMES.